(12) United States Patent
Angres et al.

(10) Patent No.: US 11,047,676 B2
(45) Date of Patent: Jun. 29, 2021

(54) CLOSING ANGLE MEASUREMENT WITH TORQUE

(71) Applicant: Steinfurth Mess-Systeme GmbH, Essen (DE)

(72) Inventors: Johann Angres, Bochum (DE); Martin Falkenstein, Bochum (DE)

(73) Assignee: Steinfurth Mess-Systeme GmbH, Essen (DE)

( * ) Notice: Subject to any disclaimer, the term of this patent is extended or adjusted under 35 U.S.C. 154(b) by 243 days.

(21) Appl. No.: 15/748,659

(22) PCT Filed: Jul. 29, 2016

(86) PCT No.: PCT/EP2016/068242
§ 371 (c)(1),
(2) Date: Jan. 30, 2018

(87) PCT Pub. No.: WO2017/017276
PCT Pub. Date: Feb. 2, 2017

(65) Prior Publication Data
US 2018/0202802 A1    Jul. 19, 2018

(30) Foreign Application Priority Data
Jul. 30, 2015 (DE) ............. 10 2015 112 574.9

(51) Int. Cl.
*G01B 11/26* (2006.01)
*B67B 3/26* (2006.01)
(Continued)

(52) U.S. Cl.
CPC .............. *G01B 11/26* (2013.01); *B67B 3/261* (2013.01); *B67B 3/264* (2013.01); *G01L 3/02* (2013.01); *G01L 5/24* (2013.01)

(58) Field of Classification Search
CPC ......... B67B 3/261; B67B 3/264; G01B 11/26; G01L 3/02; G01L 5/24
(Continued)

(56) References Cited

U.S. PATENT DOCUMENTS 5,321,935 A * 6/1994 Spatz ................... B67B 3/26
 53/490
8,001,748 B2 * 8/2011 Schulz ................. B67B 3/2093
 53/471
(Continued)

FOREIGN PATENT DOCUMENTS

| DE | 102006025811 | 12/2007 |
| DE | 102009042109 | 4/2011 |

(Continued)

OTHER PUBLICATIONS

Internationaler Recherchenbericht und Schriftlicher Bescheid [International Search Report and the Written Opinion] dated Oct. 18, 2016 From the Internationale Recherchenbehörde [International Searching Authority] Re. Application No. PCT/EP2016/068242. (12 Pages).

(Continued)

*Primary Examiner* — Tri T Ton

(57) ABSTRACT

The present invention relates to a method for the particularly automated measurement of a closing angle of a lid (110) of a container (100) particularly a bottle lid (110) with a screw thread (120) comprising the following steps:
a) Positioning of the container (100) and determining of a starting position,
b) Turning of the lid (110) from a closing position (I) into the direction of an open position (II) of the lid (110),
c) Detection of an open position (II) of the lid (110) and a corresponding open position angle β,
(Continued)

d) Calculation of the closing angle $\alpha$ of the lid (110) on the basis of the open position angle $\beta$ and particularly, a lid parameter.

11 Claims, 4 Drawing Sheets

(51) Int. Cl.
  *G01L 5/24* (2006.01)
  *G01L 3/02* (2006.01)

(58) Field of Classification Search
  USPC .......... 356/72, 138–155, 614–624, 399–401, 356/244–246
  See application file for complete search history.

(56) References Cited

U.S. PATENT DOCUMENTS

| | | | |
|---|---|---|---|
| 9,569,833 B2* | 2/2017 | Heuft | ........................ G01L 5/24 |
| 2002/0116897 A1 | 8/2002 | Higashizaki et al. | |
| 2002/0148205 A1 | 10/2002 | Takebe et al. | |
| 2009/0293437 A1 | 12/2009 | Schulz et al. | |
| 2012/0247064 A1 | 10/2012 | Forestelli et al. | |
| 2016/0146659 A1* | 5/2016 | Saltzgiver | .............. A47G 23/16 |
| | | | 206/459.1 |
| 2016/0327587 A1* | 11/2016 | Yasui | ................. G01N 35/1011 |

FOREIGN PATENT DOCUMENTS

| | | |
|---|---|---|
| DE | 1020090060625 | 6/2011 |
| EP | 2338829 | 6/2011 |
| WO | WO 2011/029617 | 3/2011 |
| WO | WO 2017/017276 | 2/2017 |

OTHER PUBLICATIONS

Prüfungsantrag [Request for Examination] dated May 17, 2017 From the Deutsches Patent-und Markenamt [German Patent and Trademark Office] Re. Application No. 102015112574.9. (6 Pages).
Mitteilung Gemaess Artikel 94(3) EPUE dated Jul. 2, 2020 From the European Patent Office Re. Application No. 16751531.1 and Its Summary in English. (8 Pages).

\* cited by examiner

CLOSING ANGLE MEASUREMENT WITH TORQUE

RELATED APPLICATIONS

This application is a National Phase of PCT Patent Application No. PCT/EP2016/068242 having International filing date of Jul. 29, 2016, which claims the benefit of priority of German Patent Application No. 10 2015 112 574.9 filed on Jul. 30, 2015. The contents of the above applications are all incorporated by reference as if fully set forth herein in their entirety.

FIELD AND BACKGROUND OF THE INVENTION

With containers which are closed with a lid it is necessary to ensure the closing of the lid in order to for example protect the content of a container from changes of the state or to prevent a leakage of the content from the container. This problem is particularly important for food since products which are intended for consumption have to reach the consumer properly upon closing the container with the help of the lid mistakes can occur by the production and closing processes which lead to an insufficient closing and/or destroying of the lid and/or the container.

In order to ensure the proper closing of the lid on the container after the closing of the lid a control is performed in which the manual method steps are controlled if the lid closes the container properly. Therefore, the lid is released from the container with a device if a previously defined torque has to be applied for the correct closing in order to release the lid from the container and to open the container.

Disadvantageous with this method, which is also performable by different employees of a company, is the influence of mistakes caused by the user and the undesired tolerances during the measurement which are related therewith. Further, due to multiple different lid geometries and materials sources of errors result which can further be negatively influenced in their relevance by manual measurements. Thus, a lid which comprises a small wall thickness can be destroyed by a torque too high, wherein the content of the container is for example at risk by environmental influences. Further, contaminations at the container or lid can represent disturbances which distort the measurement of the torque and further deteriorate the relevance of the measurement.

SUMMARY OF THE INVENTION

It is object of the present invention to at least partially avoid the previously known disadvantages from the state of the art. Particularly, it is object of the present invention to create a method and a device with which measurement inconsistencies can be at least partially avoided compared to manual measurements from the state of the art and influences depending on the user can be reduced. Further, it is object to provide a method with which the closing of the lid from a container can be reliably reviewed.

Said object is solved by a method with the features of the independent method claim and a device with the features of the independent device claim.

The method according to the invention for the measurement, particularly automated, of a closing angle of a lid of a container, particularly a bottle lid with screw thread comprises the following steps:

a) Positioning of the container and determination of the starting position, b) Turning of the lid from the closing position in direction of an open position of the lid, c) Determination of an open position of the lid and the corresponding open position angle, d) Calculation of the closing angle of the lid on the basis of the open position angle and, particularly, a lid parameter.

A basic idea of the invention is therewith to figure out by the method according to the invention if the lid of a container is properly closed or was properly closed without necessarily needing to know or to measure the desired torque for opening or closing of the angle. The closing angle of the lid used therefor therewith determines the necessary angle which ensures a reliable closing of the lid on the container. The determination of the closing angle enables a monitoring of the correct closing of the container with a reduced capability to failure by contaminations or irregularities of the geometry of the lid or the container at this position at which the lid is set on the container. In case a closed bottle is controlled with a method according to the invention, meaning if a proper closing of the lid was performed, it is figured out by the measurement if the closing angle $\alpha$ is sufficiently big in order to monitor the desired closing position of the lid. Therefore, the container is positioned in a first step, particularly in a measurement device according to the invention and a starting position for the measurement is determined. Thereby, the container can be force and/or form fittingly positioned in a corresponding retaining device (of the device). The starting position thereby determines the point at which the measurement of the angle is started. Therefore, it is meaningful to set the value of the angle at this position to "0". In the following step the lid is turned from a closing position in direction of an open position of the lid. Accordingly, the lid is in the position in which the bottle is closed by the tightened lid. The lid is force and/or form fittingly retained by a grip unit of the device and is turned by the grip module which is pivotably mounted from the closing position in direction of an open position. Within the scope of the invention it is further possible that the lid is force and/or form fittingly retained from the grip unit and the container is turned by the retaining device. For the relative movement between the lid and the container a drive can be provided with a device according to the invention. In a next step the open position of the lid and a corresponding open position angle $\beta$ is determined. The open position of the lid thereby characterizes the position in which the lid is removed from the container, particularly by a simple lifting movement to the container (without further turning). The open position of the lid thereby does not have to correspond to the position at which the lid can be removed from the container at the earliest. Rather, the open position corresponds to the position or the position of the lid at which it can be ensured that an opening or removing from the lid of the container is enabled, particularly by a simple lifting movement. This positioning is defined such that the lid has reached a position at which a closing element existent at the container and complementary configured to the lid, particularly in form of a screw thread is reached at which no more force between the lid and the container can be performed so that the lid can be removed from the container. This point can be configured as an existent screw thread, a closing element, the edge of the thread (the screw thread) of the container, wherein the corresponding complementary configured inner thread of the lid has reached the edge of the outer thread (the outer screw thread) of the container. A lid parameter is further a value which takes the properties of a lid, particularly a geometric property (different forms and/or closing elements, diameter, material strength etc.) of the to be monitored lid into account. Further, this parameter provides a possibility to determine the closing angle α more precise and to verify the measurement also by multiple measurement processes, particularly repeated.

The timely manner of steps a) to d) is thereby not defined to the set order, but can occur timely one after the other or parallel/simultaneously.

Within the scope of the invention a lid movement can be detected in vertical direction (lifting or lowering movement) during the performance of steps a) to d), particularly in the direction of the bottom of the container during the performance of the steps b) and c). A lid movement in vertical direction is characterized in that the lid moves in the direction of the bottom or in the opposing direction such that for example the lid can be removed from the container. Therewith, it is achieved that it can be monitored if the lid alters in its vertical position during the turning movement such that the lid is moved towards the container or away from the container. With the existing screw thread it can be monitored if dependent from the thread pitch and the existing turning angle of the lid a correct and/or smooth movement of the lid is performed. If a movement of the lid in the direction of the bottom (lowering movement) of the container is detected, particularly during steps b) and c) it can be recognized if a position of the lid is achieved with which an open position of the lid is ensured. With one of the existing screw threads of the bottle lid and the container defines the point at which the lid with a defined force which is applied to the lid in the direction of the bottom of the container for the first time slips off (i.e. lowers) from the edge of the thread or the last screw thread and therewith moves in the direction of the bottle bottom. Thereby, it is ensured that a point is achieved at which the lid can (in any case) be removed from the container.

Advantageously, an opening torque, particularly a maximum opening torque, can be measured particularly during the turning movement in step b) in the direction of the open position. An opening torque thereby describes the necessary torque which is necessary or has to be overcome for the movement or turning of the lid from the closing position in the direction of the open position of the lid. The maximum opening torque defines thereby the point in a torque course during the turning movement of the lid at which the maximum torque is necessary to turn the lid during the turning movement from the closing position into the open position. Normally, the maximum opening torque is at the beginning of the turning movement at which the lid tightly closes the container and for example with a screw thread most or all screw threads of the container are existent engaged with the most or all screw threads of the lid. In case the opening torque is measured during the complete turning movement meaning until reaching the open position angle β it can further be measured if a torque increase and/or a torque decrease during the open process of the lid is existent. Thereby, mistakes (production mistakes, material mistakes etc.) can for example be determined in the lid or at the container, particularly at the thread of the lid and/or container and contaminations can be determined.

It is further possible that a rupture moment is measured for a sealing for the lid, particularly during the performance of step b). Such a sealing (tamper-evident closure) ensures if a lid was already previously opened. Accordingly, during the turning of the lid a rupture moment can be measured with which a torque increase is measured which defines a point at which a sealing is at least partially released or separated the first time from the lid. This can be measured within the torque course like responding increase in the necessary torque (at this position/angle). Thereby, it can be monitored if a sealing was properly existent previous to the first open process and if this sealing is released during the turning movement accordingly such that it is ensured if the sealing properly characterizes the closing by the container of the lid.

In a further step e) the lid can advantageously be turned about at least 320° over the open position in at least one control position. The control position thereby defines a point at which the lid performs at least a second time a vertical movement (lowering movement) in the direction of the bottom of the container. Thereby, it can be monitored if the control position matches with the open position and/or in which angle the control position differs from the open position. The angle in step e) can thereby vary such that the control position can be reached multiple times such that accordingly multiple values for the control position can be measured on which basis for example a mean value is calculated which can be compared with the measured open position. Accordingly, it can be monitored if the open position is reaching at the same point of the lid position respectively and in which area the open position has to be. As already during the determination of the closing angle in step d), a force is at least temporarily applied to the lid during the turning movement in the direction of the container bottom.

A lid parameter can advantageously be applied from a lid angle γ and an angle constant, particularly an angle constant of 360° for the calculation of the closing angle α. For the calculation the lid parameter serves to determine the closing angle α more precise, wherein the lid angle γ is included in the calculation which is specifically chosen to the existent lid/lid geometry. The angle constant is an angle about which the lid is turned when the lid for the first time performs a vertical movement in the direction of the bottom of the container, particularly following a force actuation to the lid. Preferably, a constant, particularly perpendicular angle to the lid is performed in the direction of the container bottom for sliding off (lowering) in order to achieve a (possibly exact) comparable measurement. Normally, the angle constant comprises a value of 360° such that the angle between the position in which the lid is for the first time released from the container and the point at which the sliding off (lowering) of the lid meaning the vertical movement in the direction of the lid bottom is performed exact 360° and therewith a complete turning of the lid has occurred.

The lid parameter thereby characterizes the sum from optimal manner of the angle constant of 360° and the defined lid angle γ which is dependent form the used lid. With the calculation of the closing angle α therewith the lid parameter is subtractive from the measured open position angle β. This result of the calculation exactly corresponds with the closing angle α which is necessary for the existing lid in order to guarantee a proper closing of the container by the lid. The lid angle γ thereby corresponds to the angle which measures a threading edge or at least part of the threading edge, for example with a screw thread of the lid. Depending on the length of the threading edge this value varies and is included in the calculation. The design or the geometry of the threading edge can vary according to the lid model. Accordingly, the value of the lid angle γ can vary. Thereby, it is possible that the angle amount measures only part of the threading edge or the whole length of the threading edge. The lid angle γ further serves to make a comparison between a manual measurement method or measurement method by hand which differs in that different points along the threading edge are used for the measurement.

Advantageously, the lid angle γ is at least a geometric value of the lid and corresponds to a value of approximately an angle between 1° and 180°, preferably between 5° and 50°, particularly preferred between 7° and 25°. The lid angle thereby orientates at the length of the threading edge which is for example existent with a screw thread at the thread of the lid such that the beginning of the lid thread can be introduced into the thread at the container.

The threading edge and therewith the lid angle varies according to the lid geometry such that with a smaller lid only a smaller or a shorter threading edge can be used such that hereby a smaller lid angle results. In case the lid is dimensioned accordingly larger, a greater lid angle and therewith a greater threading edge can be used, wherein a greater lid angle value results. The longer the lid angle the easier the threading of the lid or the thread of the angle into the thread of the container can be performed.

Within the scope of the invention the lid can be configured cylindrical (meaning in form of a cylinder), particularly polygonal (meaning in the shape of a polygon), wherein the lid comprises a diameter of approximately between 10 mm and 500 mm, preferably between approximately 20 mm and 200 mm, particularly preferred between 25 mm and 150 mm. Normally, with containers, particularly drinking containers, cylindrical lids are used, which can comprise an inner thread, which correlates with an outer thread of the container. Further, it is possible to configure the lid polygonal, meaning with multiple edges, which is particularly advantageous for advertising purposes and the actuation since a polygonal form significantly differs from the normal cylindrical form in its outer appearance. According to the size of the container or opening size of the container the diameter of the lid can vary such that for small openings and also for big openings of a container a corresponding lid can be used and by the method according to the invention an according closing angle can be measured. Therefore, the corresponding grip unit or the retaining device is dimensioned accordingly or configured geometrically complementary.

Preferably, the speed of the turning movement is between approximately 0.01 rpm and 100 rpm, preferably between approximately 0.05 rpm and 50 rpm, particularly preferred between approximately 0.08 rpm and 20 rpm, particularly the number of rotations during the turning movement is variably adjustable (particularly, by an electronic unit). In dependence of the speed of the turning movement the measurement method can be performed faster or slower. A faster performance enables a corresponding time saving with the measurement with the method according to the invention such that in a defined time multiple bottles, multiple containers and their corresponding closing angle of the lid can be measured. With a slower speed of the turning movement more precise measurement results, particularly at the crucial points of the turning movement, can be detected or measured. Thus, it is for example advantageous to reduce the speed at points at which for example the maximum opening torque and/or the rupture moment and/or the point is achieved at which the lid performs a vertical movement in the direction of the lid bottom. For the torque course detectable during the turning movement it can be an advantage when at the neuralgic points of the turning movement the speed is reduced, whereas at less neuralgic positions of the turning movement the speed is increased such that an optimal process speed is adjustable in which precise and exact measurement results are achievable as the best speed for the measurement method. The turning movement itself can be generated by gear, particularly in form of an electromechanic motor, which is controllable by the electronic unit.

With a method according to the invention the lid and/or the container can comprise at least one mark, wherein the mark is optically detectable and thereby a lid movement is detectable. By an optic mark at the lid or at the container therewith it can further be optically detected and therewith the measurement can be more precise that for example an optic sensor detects the mark at one or multiple positions. Accordingly, a speed of the lid movement and/or a vertical movement of the lid can additionally be optically determined.

This enables for example in an easy manner the monitoring of the angle constant and thereby the accuracy of the lid parameter, which is easily detectable due to the optical marks. Thereby, it can be for example determined if the mark at a lid and a mark at the container at the point of time of the lid movement in vertical direction and a subsequent turning about 360° of the lid at the same point of the mark occurs again.

A further aspect of the invention relates to a device for, particularly automated, measurement of a closing angle of a lid of a container, particularly a lid with a screw thread comprising at least one retaining device for positioning of the container, at least a grip unit for the form and/or force fitting acceptance of the lid at the container at least one of the following sensors: torque sensor at least for measurement of an opening torque of the lid, angle sensor for determining of at least one open position angle, height sensor for the determination of at least lid movement, temperature sensor, pressure sensor for the determination of at least one inner pressure of the container and/or the lid, and at least one electronic unit and at least one gear.

The retaining device for positioning of the container is thereby advantageously configured such that, particularly with adjustable retaining elements and/or brackets, the container can be force and/or form fittingly fixed from the retaining device. Thereby, the retaining device can clamp the container at one or multiple positions, particularly completely and/or in the bottom area. Thereby, the retaining device can comprise a pre-tensioning force such that the container has to be clamped into the retaining device against the pre-tensioning force. Further, it is possible that the retaining device comprises more contact to the container in a starting position and after the start of a measurement the retaining device retains the container form and/or force fittingly. Therefore, the retaining device can comprise one or multiple retaining elements, which fix the container at different positions. Preferably, the retaining device is located in the area of the bottom of the container, wherein, however, a positioning along the container body is imaginable. Normally, the container, however, comprises the highest form stability at the bottom such that it is meaningful to apply the retaining device at this position.

Further, the device according to the invention comprises a grip unit for the form and/or force fitting acceptance of the lid at the container. The grip unit can thereby, similar to the retaining device, be pretensioned with a pre-tensioning force such that during setting of the grip unit on the lid the pre-tensioning force has to be overcome and thereby the lid is clamped into the grip unit. Thereby, the grip unit can for example comprise conically tapered forms such that the lid has to be introduced in the grip unit until a form and/or force fitting retaining is reached. Further, the grip unit can comprise multiple grip elements, which perform a form and/or force fitting acceptance of the container only after the start of the measurement. Thereby, the grip unit or the grip elements can accept the lid at multiple positions or completely.

A torque sensor with the device according to the invention thereby serves at least for measuring an opening torque of the lid. The opening torque thereby defines the torque, which is necessary to perform the open movement of the lid. Further, the torque sensor can measure a torque course during the open movement such that at multiple positions during the turning movement the torque is measured and it can be determined in relation to the course if an proper open process or a rupture moment for the seal (originality seal) is achieved. Consequently, in the torque course an increase or decrease of the torque can provide information about positions during the turning movement.

An angle sensor serves for the recognition of at least one open position angle of the lid, which reflects an open position of the lid. Further, an angle sensor can constantly recognize the angle of the lid during the turning movement or at multiple positions. Thereby, the angle sensor can for example recognize the turning movement of the grip unit and/or the retaining device. In case a torque sensor and an angle sensor are used the course of a measured torque and the course of the angle can be compared to one another such that at the corresponding angle position the according torque can be assigned. Thereby, additional information for the turning movement of the lid result, which can provide information about the open position angle.

A height sensor serves for the recognition of at least one lid movement, particularly in vertical direction such that a lowering of the lid in the direction of the bottom of the container and a lifting of the lid in opposing direction to the bottom of the container can be detected. Thereby, it can be monitored if the lid moves away from the container during a turning movement into the open position meaning against the reaction of the container bottom. Therewith, it can for example be detected if a movement is performed with a screw thread of the container and the lid according to the angle of elevation of the lid. Besides the lowering of the lid with reaching the open position angle or a control position it can be detected at which point the lid performs no more variation of the vertical movement. The temperature sensor thereby serves to measure the temperature of the lid and/or container and/or the content of the container. The temperature sensor can for example serve for measuring a temperature increase, which results due to a friction caused by a corresponding opening torque such that by the measured temperature further information for the open process can be collected. A pressure sensor serves for the recognition of at least one inner pressure of the container or a pressure of the lid. Depending on the content of the container the inner pressure of the container is crucial for a monitoring of the correct closing of the container. Therewith, it can be detected by a recognition of the inner pressure at which point the inner pressure of the container decreases, meaning at which position of the lid a pressure can leak from the container. The pressure sensor can also measure the pressure of the lid which is performed from a container to the lid or vice versa or which pressure or which force is performed from the grip unit to the lid to achieve a vertical movement of the lid during a reaching of the open position angle. Hereby, a simple optical pressure measurement of the closed container is possible by an optical measurement sensor possibly in combination with a light source.

As a torque sensor a torque receiver, particularly at least a strain gauge (DMS) and/or a piezoelectric torque receiver and/or magnetoelastic torque receiver can preferably be used. Particularly, the torque sensor is arranged at the grip unit and/or at the retaining device. A torque receiver can thereby measure the opening torque and/or maximum opening torque during the turning movement, wherein a strain gauge is arranged in the grip unit and/or in the retaining device, particularly in the retaining elements or the grip elements. The strain gauge thereby precisely indicates a corresponding applied torque with a compact construction at the same time. With a piezoelectric torque receiver following a force impact by the torque an electric tension is generated, which can be calculated to a corresponding torque. Thereby, a piezoelectric torque receiver can for example be arranged in the grip unit and/or in the retaining device such that during a turning movement the force impacting the piezoelectric torque receiver can be transferred into the corresponding tension. A magneto elastic torque receiver measures following an applied magnetic field the deformation of a magnetic material. Thereby, the sensor experiences an elastic length alteration during a constant volume, wherein the alteration of the magnetic field is transferred or calculated to a corresponding torque. An optic or optoelectric sensor can transfer light by using a photo electric effect in an electric signal or show an electric resistance depending on the incident radiation. Thus, a deformation of the lid and/or the container can for example be detected by an optical sensor and therewith be calculated by the sensor in a corresponding torque. It is particularly preferred that the torque sensor is arranged at the grip unit and the retaining device. Thus, a compact construction of the device is enabled and a precise measurement of the torque at the grip unit and/or retaining device is ensured. Further, the torque sensor can be an electric step motor which serves as a drive and as a sensor. Thereby, the single steps of the step motor and the power input of the step motor or a normal e-motor can be measured such that with a corresponding force the according power of the motor can be measured and compared, whereupon a torque and particularly a torque course can be measured. Thus, for example an increase of the necessary torque can be measured by an increase of the necessary power input of the motor. At the same time, due to the step motor and the measurement of the performed steps an angle can be measured, which is performed by the step motor during the torque course. Accordingly, a step motor and/or an e-motor can be used as an angle sensor and as a torque sensor.

Within the scope of the invention the angle sensor can be a rotary input type encoder, particularly an incremental encoder, particularly the angle sensor can be arranged at the grip unit and/or at the retaining device. A rotary encoder can, for example, measure the turning movement for example via sliding contacts and therewith the angle of the lid. Further, a photoelectric scanning is possible, particularly with a marking at the lid or at the container can be measured optically and therewith photo electrically. The sliding contact or a magnetic scanning can for example be performed at the grip unit and/or the retaining device such that with a turning movement of the grip unit and/or retaining device a corresponding magnetic scanning or a resistance alteration can be measured in an incremental encoder. Further, it is possible that a step motor is used as an angle sensor, wherein a defined step comprises an according angle such that during the recognition of the performed steps the step motor can be closed to an angle.

Within the scope of the invention the height sensor can be a path sensor, particularly an inductive and/or capacitive and/or optic path sensor, particularly the height sensor can be arranged in the guidance element, wherein particularly at the guidance element at least one grip unit and/or retaining device is arranged. With this path sensor as a height sensor the performed path of the lid can be measured, which particularly is performed in a vertical direction. Thereby, the path sensor can be an inductive or capacitive or optic path sensor such that the magnetic field can be detected with an inductive measurement due to a height alteration of the lid. With the capacitive path sensor or height sensor an alteration of the capacity following the height alteration of the lid is measured. An optical sensor can thereby detect by scanning of the lid and/or marking of the lid and/or the container a height alteration and therewith a position alteration of the lid. It is particularly an advantage that the height sensor is arranged at the guidance element. Thereby, the guidance element can be arranged rigidly such that during a movement of the lid along the guidance element depending on the sensor an alteration for example of the capacity or the magnetic field can be measured. It is preferred that at the guiding element the grip unit and/or the retaining device is arranged. Accordingly, a compact construction results with which the grip module, the retaining device and the turning unit can be arranged at the guidance element. The guidance element can thereby serve as a frame for the measurement device at which the components can be arranged rigidly or reversibly.

Within the scope of the invention the temperature sensor can for example be a NTC thermistor, PTC thermistor, semiconductor, thermocouple, optical sensor or a bimetal. In dependence of the desired position at which a temperature should be measured it can be meaningful to use different temperature sensors, such that for example with a contact-free temperature measurement an optical sensor is advantageous. Temperature sensors can for example be realized cost-effectively as bimetal, NTC thermistor, PTC thermistor, semiconductor or thermocouple.

It can be an advantage that the pressure sensor is at least a piezoresistive sensor, piezoelectric sensor, a hall generator, a capacitive sensor, an optic sensor or an inductive sensor. Thereby, further multiple different forms of pressure sensors can be used. Inductive, optical, capacitive sensors and hall generators enable thereby a contactless measurement of the pressure and can therewith be advantageous. In case at the corresponding measuring point no contact to the to be measured fluid or to the measured element results. A piezoresistive senor or a piezoelectric sensor, however, can be used when the sensor has contact to the to be measured element or component which can be for example advantageous with the pressure measurement of the lid of the grip unit on the lid.

Within the scope of the invention it is possible that at least a sensor is integrated into a drive. Thereby, it can be a sensor function which is provided from the drive. For example, hereby a step motor can be used, which besides the drive for, for example the turning movement or a horizontal movement beneath the performed steps can measure a corresponding angle. Further, a torque can be measured in the drive, wherein with an increase of the power intake of the drive, a corresponding torque can be closed. Therewith, a sensor function combines for example a sensor in the drive multiple function so that a compact construction and cost efficient realization of the device is achievable.

Advantageously, the electronic unit can comprise a control element and/or a display element. Thereby, the control element serves for example to start, to stop and/or to interrupt the measurement process. Thereby, it is possible that via the control element for example a speed of the turning movement a to be applied torque or a retaining force for the grip unit and/or the retaining device can be controlled. Accordingly, via the control element all necessary components for the measurements like the retaining device, the grip unit and/or the drive can be regulated and/or controlled. The display element thereby serves for, for example to be able to optically show the torque course, the course of the turning speed or other measurement signals, which of the used sensors. Therewith, for example it can be controlled by a user if errors occur during the measurement or if the measurement is correct. Expediently, said sensors are at least partially data technically and/or electrically connectable with the electronic unit and can transfer the measurement data for the further processing and saving at the electronic unit. Herefore, the sensors can be wired or interact wirelessly with the electronic unit, which serves for the actors already mentioned, like for example gear, grip unit and/or retaining device etc.

Further, it is possible that the electronic unit comprises a memory in which the method according to the invention can be saved. Accordingly, the device and/or the electronic unit are configured such that a method according to the independent method claim is performable. Further, the electronic unit can have an interface for an external data exchange.

The device according to the invention and/or the method according to the invention enable the at least partial automatic (meaning not-manual) use in the serial production (for example, of a bottling plant for containers) and can therewith be integrated into a production line. Therewith, a significant safety and time gain are connected. Further, it is possible to run the method and the device as a stand-alone method or a stand-alone system in order to, for example particularly automatically control random samples from different production lines.

The measures listed in the dependent claims enable advantageous embodiments and improvements of the device and method of the independent claims. Further features and details of the invention result from the description and the drawings. Thereby, features and details, which are described in relation to the method according to the invention, naturally also apply in relation to the method according to the invention and vice versa such that according to the disclosure of the single aspects of the invention it can always be reciprocally related to.

BRIEF DESCRIPTION OF THE SEVERAL VIEWS OF THE DRAWINGS

Further, measures improving the invention result from the subsequent description to some embodiments of the invention, which are schematically shown in the figures. Thereby, it has to be noted that the figures have only descriptive character and are not intended to limit the invention in any manner. The previous description of the embodiments describes the present invention only within the scope of examples. Naturally, single features of the embodiments as far as technically meaningful can be freely combined with one another without leaving the scope of the invention. It is shown schematically.

DESCRIPTION OF SPECIFIC EMBODIMENTS OF THE INVENTION

Figure 1:
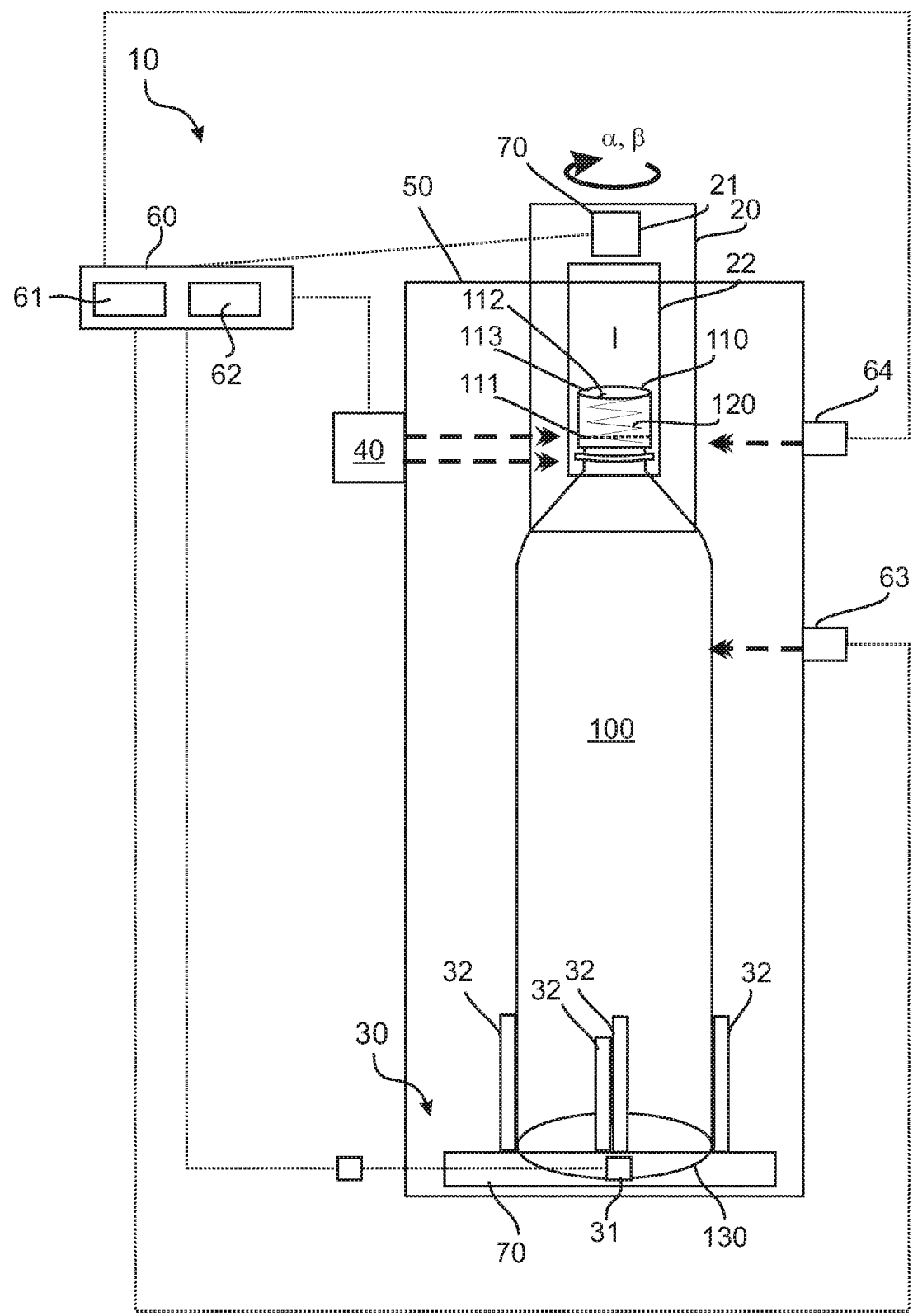
FIG. 1 a first embodiment of the device according to the invention, wherein the container is in the closing position I, FIG. 2 the embodiment of the device according to the invention from FIG. 1, wherein the container is in the open position II, FIG. 3 a flow diagram of the method according to the invention, FIG. 4 a detection according to the invention of the closing angle α, which is graphically represented.
Figure 2:
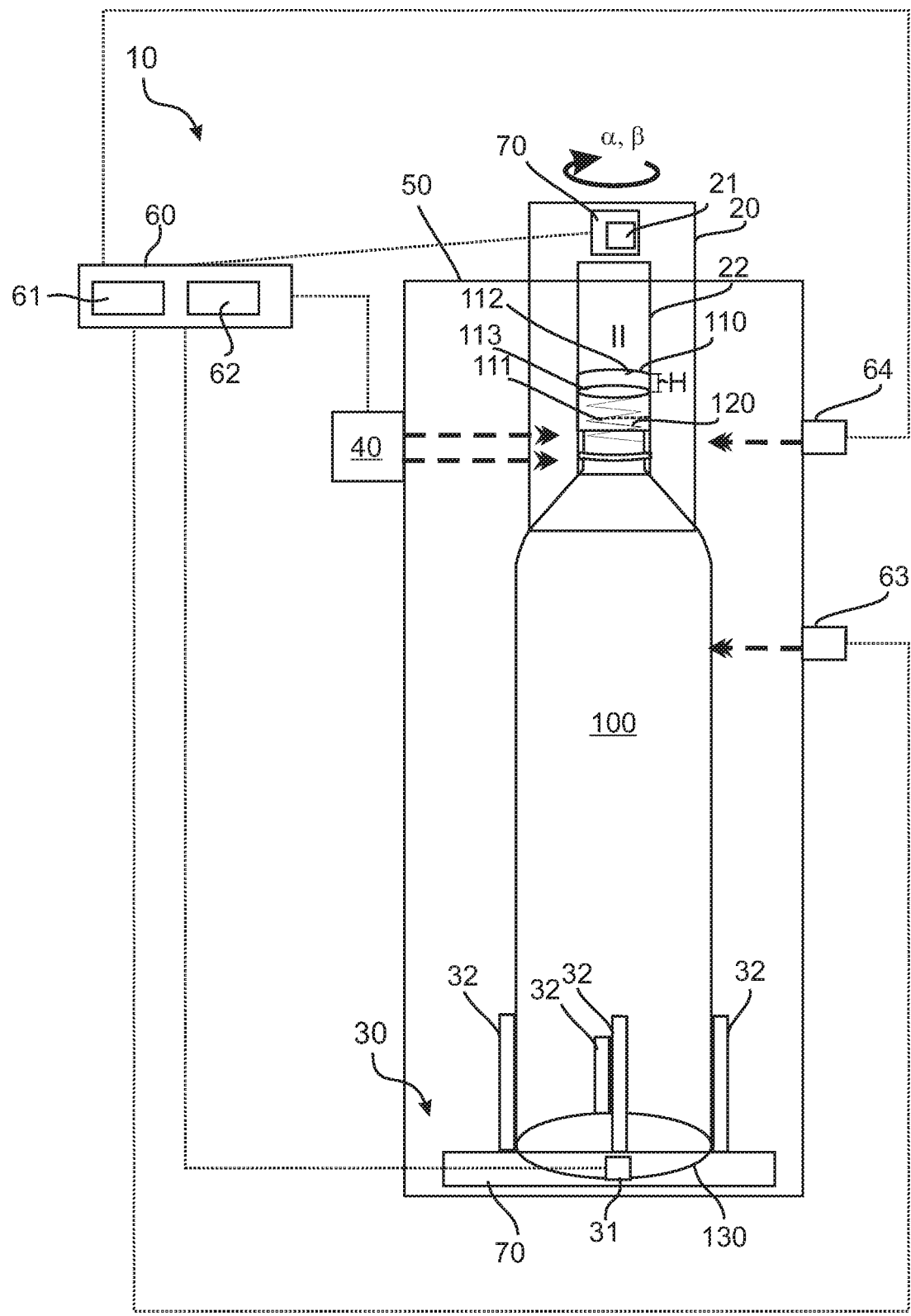

FIG. 1 is an embodiment of the device 10 according to the invention for measuring a closing angle α of the lid 110, which is shown in the dosing position I on the container 100. The container 100 is hereby a fluid container in form of a bottle 100, which comprises a container neck or bottle neck in the upper area of the container 100, an opening 113 through which for example a liquid can be inserted or emptied. In FIG. 1, the lid 110 is positioned at the bottle neck or the opening 113 such that in the shown closing position I the lid closes the opening 113 of the bottle mostly fluid-tight. Thereby, the lid 110 is screwed to a thread 120 in the area of the opening 113 of the container 100. Likewise, in the area of the container neck the grip unit 20 of the measurement device 10 is arranged at the guidance element 50, wherein a part of the grip unit 20 extends via the container neck and, particularly via the lid 110 such that the lid 110 is enclosed from the grip unit 20. The grip unit 20 can thereby be configured, for example cylinder-like and comprise an inner diameter, which is greater than the diameter of the lid 110. Therewith, it is achieved that the grip unit 20 can receive the lid 110 and the open process is initiated. Therefore, on the inner side of the grip unit 20 a mechanism 22 is provided with which the lid 110 is fixed and form fittingly and/or force fittingly retained. The mechanism 22 can for example be a conically tapered form of the grip unit 20 and a moveable mechanism like shown here, which encloses the lid 110 after an actuation such that a form and/or force fit is only reached after actuation (FIG. 2). The grip unit 20 is in FIG. 1 pivotably mounted, wherein an opening process of the lid 110 is achieved by a turning movement of the grip unit 20 from the drive 70 in the corresponding open direction the leading to moving the lid 110 or via the thread 120 in direction of the open position II. At the lid 110 a sealing 111 is arranged, which entirely is in its in the lower area of the lid 110, where the opening of the lid 110 is arranged, configured from one material with the lid 110. The sealing 111 indicates if the closure is already opened, wherein in FIG. 1 the sealing is not yet damaged, thus the lid is not opened. The lid 110 comprises at least one marking 112, wherein the marking 112 is optically recognizable and thereby a lid movement is detectable. Further, an angle sensor 21 is arranged at the grip unit 20 via which the turning movement of the grip unit 20 is detected and measured. The angle sensor 21 is in signal connection with the electronic unit 60 and can be provided with energy from the electronic unit 60. The electronic unit 60 serves for the processing of the data detected by the sensors 21, 31 and further the device can be actuated and controlled via the actuating element 61. Via the display element 62 of the electronic unit 60 can, for example a torque course of the turning angle or among others information of the height sensor 40 a measurement data of the sensors particularly with each turning angle be shown or displayed. Naturally, the correct closing of the container can be determined and displayed via the display element 62 using the measured and the partially provided values. The height sensor 40 is in FIG. 1 arranged, positioned at the guidance element 50 and signal connected with the electronic unit 60, in a way that the height sensor 40 is in the area of the lid 110 and the opening of the container 100. This enables an exact measurement of the movement of the lid 110 in a vertical direction and in direction of the open position II and in direction of the closing position I and container bottom 130. In the area of the container bottom 130 the retaining device 30 is arranged in which the container 100 can be positioned and/or fixed via the retaining device 30. Therefore, the retaining device 30 in FIG. 1 comprises four retaining elements 32, which position and form and/or force fittingly fixate at the container 100 at four positions in the area of the container bottom 130. The container 100 is fixed in its position by the four retaining elements 32 such that during an open movement of the grip unit 20 the container does not leave its starting position. The torque performed by the turning movement to the container 100 is measured by the torque sensor 31. Likewise, the torque sensor 31 is in signal connection with the electronic unit 60 and can as needed be provided with energy from the electronic unit 60. Likewise, the retaining device 30 is arranged at the guidance element 50 such that a compact measurement device results with which all components 20, 30, 40, 50, 60 are connected. Further, FIG. 1 shows a temperature sensor 63 and a pressure sensor 64, which are arranged both at the guidance element 50.

FIG. 2 shows a device 10 according to the invention in the embodiment of FIG. 1, wherein the lid 110 is in the open position II, and the marking 112 has moved with the lid 110. In the open position II it is possible to remove the lid 110 from the container 100 since the inner thread of the lid 110 is no longer in active connection with the thread 120 of the container 100. The grip unit 20 has turned the lid 110 in the direction indicated by the arrow about at least the open position angle by a force fitting connection with the lid 110, which is achieved by a mechanism 22, such that the lid 110 has moved in the represented open position II via the thread 120. Thereby, the lid 110 following a rotational movement of the lid 110 performs a vertical movement upwards to a height H, namely opposing to the container bottom 130. This results due to the incline of the thread. 120 of the container 100 along which the lid 110 is moved in the open position II. This vertical movement is detected and measured by the height sensor 40. Thereby, the amended height of the lid 110 (particularly, for each turning angle) is retained and can be detected by constant measurement of the movement form. In parallel, the performed angle of the lid 110 is measured by the angle sensor 21, which following the turning movement of the grip unit and therewith the lid 110 is performed. In connection with the data of the height sensor 40 it can be determined which movement form of the lid 110 is performed. In case the lid 110 is evenly moved upwards along the thread 120, or in case deviations with the movement form appeared, wherein for example it can be concluded to an error at the thread 120 of the container 100 or at the thread of the lid 110. Further, FIG. 2 shows a temperature sensor 63 and a pressure sensor 64, which are both arranged in the guidance element 50.

Figure 3:
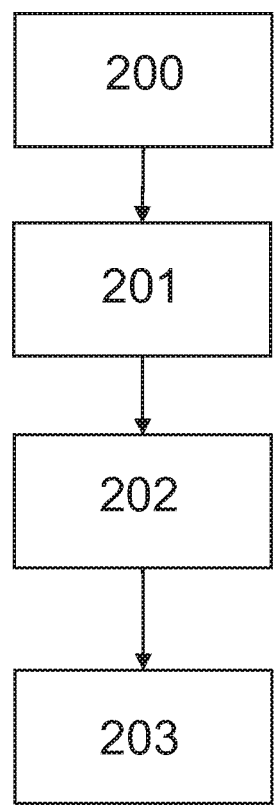

In FIG. 3 an embodiment of the method according to the invention is shown at the flow chart, wherein in step 200 the positioning of the container and the determination of the start position is performed. With the step 201 the turning of the lid from a closing position in the direction of an open position of the lid is represented. In step 202 an open position of the lid and a corresponding open position angle β is recognized. The following step 203 characterizes the calculation of the closing angle of the lid on basis of the open position angle and particularly a lid parameter. The order of the steps is thereby not determined to the shown sequence, but can be performed timely one after the other or parallel/simultaneously.

Figure 4:
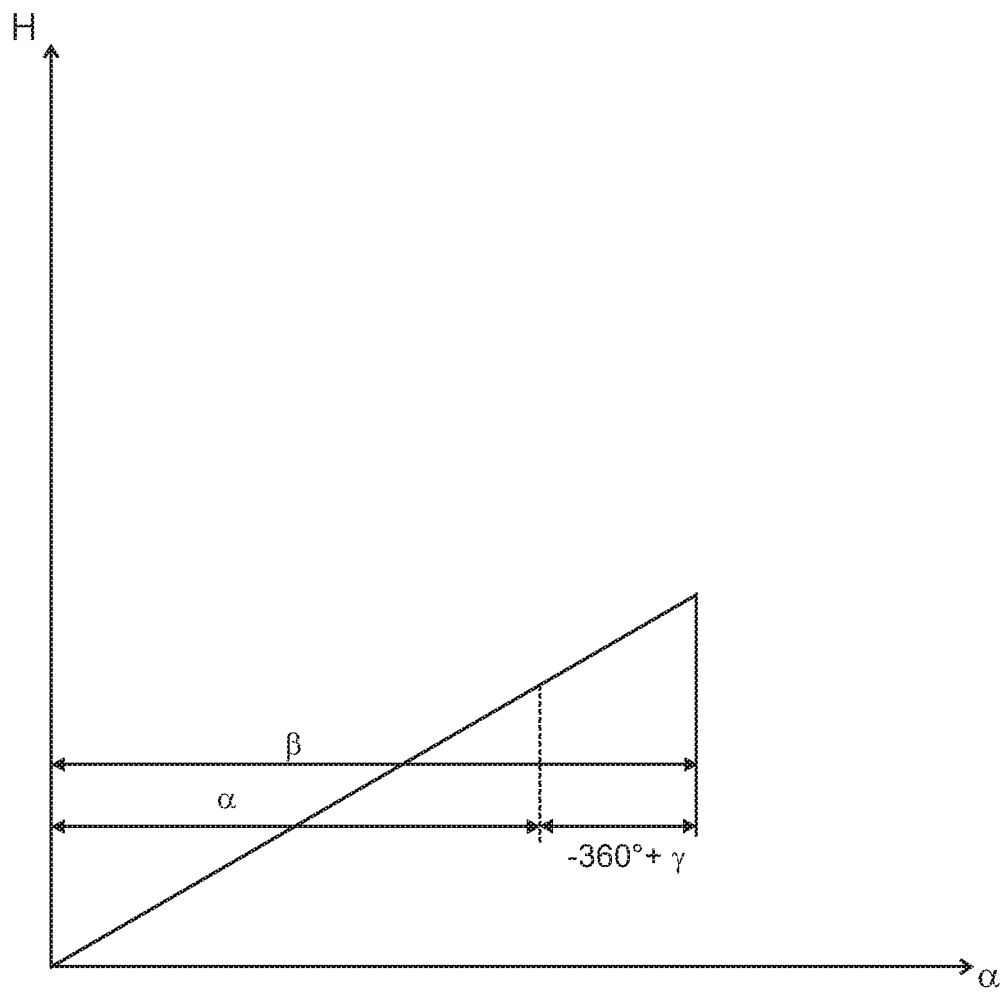

FIG. 4 shows the height meaning the vertical position of the lid (y-axis) in the course of the turning movement according to the angle α (x-axis) schematically in a coordinate system. The open position angle β therewith shows a point at which a release of the lid is detected. The release and therewith the vertical movement in the direction of the bottom of the container defines therewith the end point of the incline of the shown graph, wherein an open position angle β results. For the determination of the closing angle α now from the open position angle β the lid parameters are subtracted such that the closing angle α results, which is shown along the shown graph by a dotted vertical line.

REFERENCE LIST

10 Measuring device
20 Grip unit
21 Angle sensor
22 Mechanism
30 Retaining device
31 Torque sensor
40 Height sensor
50 Guidance element
60 Electronic unit
61 Control element
62 Display element
63 Temperature sensor
64 Pressure sensor
70 Drive
100 Container
110 Lid
111 Sealing
112 Marking
113 Opening
120 Screw thread
130 Container bottom
α Closing angle
β Open position angle
γ Lid angle
I Closing position
II Open position
200 Method step a)
201 Method step b)
202 Method step c)
203 Method step d)

What is claimed is:

1. A method for the measurement of a closing angle of a lid of a container with a screw thread comprising the following steps:
   a) Positioning of the container with at least one retaining device and determining of a starting position,
   b) Gripping the lid with at least one grip unit configured for form or force fitting acceptance of the lid, and turning of the lid with the grip unit from a closing position into the direction of an open position of the lid,
   c) Detection of an open position of the lid with at least one of a height sensor, a temperature sensor, and a pressure sensor for the recognition of at least one inner pressure of at least the container or the lid, and detection of a corresponding open position angle β with an angle sensor,
   d) Calculation of the closing angle α of the lid on the basis of the open position angle β;
   wherein the method is performed using a device comprising at least one electronic unit and at least one drive;
   wherein a lid movement in a vertical direction is detected with the height sensor during the performance of steps a) through d);
   wherein the height sensor is an inductive path sensor, a capacitive path sensor, or an optical path sensor.

2. The method according to claim 1, wherein a lid movement in vertical direction is detected with the height sensor during the performance of the steps a) to d).

3. The method according to claim 1, wherein an opening torque of the lid is measured into the direction of the open position with a turning torque sensor.

4. The method according to claim 1, wherein a rupture moment is measured for a sealing of the lid.

5. The method according to claim 1, wherein in a further step e) the lid is at least turned about 320° exceeding the open position into at least a control position.

6. The method according to claim 1, wherein the lid parameter is a sum from a lid angle γ and an angle constant.

7. The method according to claim 1, wherein the lid angle γ is at least a geometric value of the lid and a value of approximately between 1° and 180°, preferably between 5° and 50°, preferred between 7° and 25°.

8. The method according to claim 1, wherein the lid is configured cylindrical, wherein the lid comprises a diameter of approximately 10 mm to 500 mm, preferably between approximately 20 mm and 200 mm, preferred between 25 mm and 150 mm.

9. The method according to claim 1, wherein the turning movement comprises between approximately 0.01 rpm and 100 rpm, preferably between approximately 0.05 rpm and 50 rpm, preferred between approximately 0.08 rpm and 20 rpm.

10. The method according to claim 1, whereinat least the lid or the container comprises at least one marking, wherein the marking is optically recognizable and thereby a lid movement is detectable.

11. The method according to claim 1 wherein in step d the closing angle α of the lid is calculated on the basis of the open position angle β and a lid parameter.

* * * * *